(12) United States Patent
Haraguchi et al.

(10) Patent No.: US 7,378,461 B2
(45) Date of Patent: May 27, 2008

(54) CURABLE EPOXY RESIN COMPOSITIONS AND PROCESS FOR PRODUCTION THEREOF

(75) Inventors: Kazutoshi Haraguchi, Chiba (JP); Akira Ohbayashi, Sakura (JP)

(73) Assignee: Kawamura Institute of Chemical Research, Sakura-Shi (JP)

( * ) Notice: Subject to any disclaimer, the term of this patent is extended or adjusted under 35 U.S.C. 154(b) by 374 days.

(21) Appl. No.: 10/492,194

(22) PCT Filed: Oct. 31, 2002

(86) PCT No.: PCT/JP02/11395

§ 371 (c)(1),
(2), (4) Date: Apr. 20, 2004

(87) PCT Pub. No.: WO03/037985

PCT Pub. Date: May 8, 2003

(65) Prior Publication Data

US 2004/0254328 A1    Dec. 16, 2004

(30) Foreign Application Priority Data

Oct. 31, 2001 (JP) .............................. 2001-334477

(51) Int. Cl.
*C08G 59/14* (2006.01)
*C08K 3/38* (2006.01)
(52) U.S. Cl. ................... 523/445; 525/504; 525/523; 528/121; 528/122; 528/123; 528/124
(58) Field of Classification Search ............ None
See application file for complete search history.

(56) References Cited

U.S. PATENT DOCUMENTS

| | | | | |
|---|---|---|---|---|
| 3,704,229 A | * | 11/1972 | Tashiro et al. | 252/182.18 |
| 4,529,467 A | | 7/1985 | Ward et al. | 156/307.3 |
| 5,397,645 A | | 3/1995 | Varma et al. | |
| 5,464,910 A | * | 11/1995 | Nakatsuka et al. | 525/486 |
| 5,834,551 A | * | 11/1998 | Haraguchi et al. | 524/492 |
| 6,462,106 B2 | * | 10/2002 | Shirakawa et al. | 523/404 |
| 2006/0280949 A1 | * | 12/2006 | Shirakawa et al. | 426/418 |

FOREIGN PATENT DOCUMENTS

| | | |
|---|---|---|
| GB | 2255560 A | 11/1992 |
| JP | 5-59261 | 3/1993 |
| JP | 6-73156 | 3/1994 |
| JP | 6-172495 | 6/1994 |
| JP | 8-100107 A * | 4/1996 |
| JP | 9-268224 A * | 10/1997 |
| JP | 10-025334 | 1/1998 |
| JP | 10-25334 A * | 1/1998 |
| JP | 2002-338787 | 11/2002 |
| SU | 514004 | 10/1976 |

OTHER PUBLICATIONS

Patent Abstracts of Japan abstract for Japanese Patent No. 2002-338787, Kawamura et al., Nov. 27, 2002, one page.*
CAPLUS accession No. 2002:900988 for Japanese Patent No. 2002-338787, Nov. 27, 2002, abstract, two pages.*
Derwent accession No. 2003-304416 for Japanese Patent No. 2002-338787, Nov. 27, 2002, abstract, one page.*
Chemical abstracts registry No. 169149-50-2 for Epiclon B 053, 2006, one page.*
Chemical abstracts registry No. 693-98-1 for Curezol 2MZ, or 2-methylimidazole, 1097, one page.*
Chemical abstract registry numbers for Curezols 2MZ, 2E4MZ, C11Z, 2PZ and C 17Z, 2007, five pages.*
European Search Report dated Feb. 8, 2006.

* cited by examiner

*Primary Examiner*—Robert Sellers
(74) *Attorney, Agent, or Firm*—Kratz, Quintos & Hanson, LLP (57) ABSTRACT

The invention relates to (1) a curable epoxy resin composition comprising (A) a non-gel type amine-modified epoxy resin which is obtained by reacting an epoxy resin with a polyamine and (B) at least one of boric acid and boric ester, (2) a powder form of the curable epoxy resin composition and a process for its production, and (3) a process for production of heat-resistant laminated sheets by using the curable epoxy resin composition. The invention provides (1) a curable epoxy resin composition capable of giving a cured article having a high glass transition temperature and excellent mechanical properties, (2) a powder form of curable epoxy resin composition having a high glass transition temperature, excellent mechanical properties and excellent storage stability and a process for its production, and (3) heat-resistant laminated sheets made by using the curable epoxy resin compositions and having excellent heat resistance and mechanical properties.

3 Claims, 2 Drawing Sheets

CURABLE EPOXY RESIN COMPOSITIONS AND PROCESS FOR PRODUCTION THEREOF

BACKGROUND OF THE INVENTION

1. Field of the Invention

The present invention relates to curable epoxy resin compositions and a process for the production thereof.

This application is a continuation of the National Stage of International Application No. PCT/JP02/11395, filed on Oct. 31, 2002, the content of which is incorporated herein by reference.

Priority is claimed on Japanese Patent Application No. 2001-334477, filed Oct. 31, 2001, the content of which is incorporated herein by reference.

2. Description of Related Art

Due to their high levels of reactivity and superior resin characteristics, epoxy resins are used in a wide variety of fields, including laminated sheets, sealing materials, paints, anticorrosion primers, adhesive materials, molded materials, and construction materials. In recent years, problems such as heat generation associated with the shift to higher frequency electronic equipment, and the need to adapt to lead-free solder have meant that the development of curable epoxy resin compositions capable of producing heat resistant cured products with high glass transition temperatures that can be used in laminates, adhesives, paints and binders and the like has become a priority.

One representative example of a process for improving the heat resistance of a cured product of an epoxy resin is a process in which a boron compound is added to a mixed system of an epoxy resin and an amine based curing agent (see Japanese Unexamined Patent Application, First Publication No. Hei 5-59261). However, simply adding a boron compound to a mixed system of an epoxy resin and an amine based curing agent in this manner does not significantly increase the glass transition temperature of the cured product, and the heat resistance of the cured product remains inadequate. Furthermore, because aggregates of the boron compound are dispersed unevenly through the product, the cured product tends to be brittle.

Furthermore, in another known process for improving the storage stability of a curable epoxy resin composition, a gel product produced by reacting a polyamine with an epoxy resin is subjected to a mechanical crushing treatment to produce a powder of ultra-fine particles, the surface of these ultra-fine particles are coated with a borate ester to form a latent curing agent, and this latent curing agent is then added to an epoxy resin (see Japanese Unexamined Patent Application, First Publication No. Hei 6-73156). However, even if this latent curing agent is in the form of a powder of ultra-fine particles, because the agent is still essentially a gel cured product, it cannot be uniformly compatible with the epoxy resin. In addition, the borate ester coated onto the surface of the powder aggregates markedly during curing of the epoxy resin. As a result, the curing performance of the epoxy resin deteriorates, and the glass transition temperature of the obtained cured product does not increase significantly, meaning the glass transition temperature of the cured product does not increase significantly, and the heat resistance of the cured product is still inadequate. Furthermore, the marked aggregation of the borate ester causes the cured product to become brittle.

SUMMARY OF THE INVENTION

An object of the present invention is to provide a curable epoxy resin composition capable of producing a heat resistant cured product with a high glass transition temperature.

Another object of the present invention is to provide a curable epoxy resin composition capable of producing a cured product with a high glass transition temperature, as well as excellent mechanical properties such as tensile strength and elastic modulus.

Yet another object of the present invention is to provide a powdered curable epoxy resin composition which not only enables the production of a heat resistant cured product with a high glass transition temperature, but also enables the production of a cured product with excellent mechanical properties such as tensile strength and elastic modulus, and displays excellent storage stability.

Yet another object of the present invention is to provide a laminated sheet such as a copper clad laminated sheet for use as a wiring substrate, which is produced using a curable epoxy resin composition described above, and displays excellent heat resistance and mechanical properties.

As a result of intensive research aimed at achieving the above objects, the inventors of the present invention made the following technical discoveries. Namely, that a mixed system comprising (A) a non-gel type amine modified epoxy resin obtained by reacting an epoxy resin and a polyamine, and (B) at least one of boric acid and a borate ester easily forms a uniform mixed system. Moreover, in this type of mixed system, even if the content of the above component (B) is increased, the component (B) still compatibly or disperses uniformly within the component (A), and consequently during curing of the epoxy resin composition, both components (A), (B) undergo reaction uniformly, without any aggregation of the component (B). As a result, the cured product not only acquires a very high glass transition temperature and superior heat resistance, but also displays excellent mechanical properties such as tensile strength and elastic modulus.

The present invention is based on the above technical findings, and provides a curable epoxy resin composition comprising (A) a non-gel type amine modified epoxy resin obtained by reacting an epoxy resin and a polyamine, and (B) at least one of boric acid and a borate ester.

Furthermore, the present invention also provides a process for producing a powdered curable epoxy resin composition comprising the steps of: removing the organic solvent from a solution produced by uniformly dissolving (A) a non-gel type amine modified epoxy resin obtained by reacting an epoxy resin and a polyamine, and (B) at least one of boric acid and a borate ester in (C) the organic solvent; and crushing the resulting solid curable epoxy resin composition.

In addition, the present invention also provides a process for producing a molded cured product, wherein a powdered curable epoxy resin composition comprising (A) a non-gel type amine modified epoxy resin obtained by reacting an epoxy resin and a polyamine, and (B) at least one of boric acid and a borate ester is subjected to compression molding under heat, thereby curing the composition by causing a reaction between the amine modified epoxy resin and at least one of the boric acid and borate ester.

Furthermore, the present invention also provides a process for producing a heat resistant laminated sheet comprising the steps of: providing an uncured coating layer of a curable epoxy resin composition comprising (A) a non-gel type amine modified epoxy resin obtained by reacting an epoxy resin and a polyamine, and (B) at least one of boric acid and a borate ester on the surface of a heat resistant substrate sheet; layering a separate heat resistant substrate sheet and the uncured coating layer; and subjecting the two heat resistant substrate sheets to thermocompression bonding, thereby curing the uncured coating layer by causing a reaction between (A) the amine modified epoxy resin, and (B) at least one of the boric acid and borate ester.

A curable epoxy resin composition of the present invention comprising (A) a non-gel type amine modified epoxy resin obtained by reacting an epoxy resin and a polyamine, and (B) at least one of boric acid and a borate ester produces a cured product that displays a glass transition temperature that is much higher than that of a cured product from an epoxy resin with an identical composition, but with the exception of containing neither boric acid nor a borate ester. In other words, a curable epoxy resin composition of the present invention provides a cured product with a glass transition temperature that is 50 to 200° C. higher than that of a cured product from an epoxy resin with an identical composition, but with the exception of containing neither boric acid nor a borate ester.

Furthermore, a curable epoxy resin composition of the present invention produces an epoxy resin cured product that not only has a high glass transition temperature, but also displays excellent mechanical properties. Namely, a curable epoxy resin composition of the present invention provides a cured product with a glass transition temperature that is 50 to 200° C. higher, a tensile strength that is 10 MPa to 20 MPa greater, and a tensile elastic modulus that is 300 MPa to 1000 MPa greater than that of a cured product from an epoxy resin composition with an identical composition, but with the exception of containing neither boric acid nor a borate ester.

In addition, a powdered curable epoxy resin composition of the present invention not only produces a cured product with a high glass transition temperature and excellent mechanical properties, but also displays excellent storage stability and transportability. In other words, a powdered curable epoxy resin composition of the present invention displays good thermal workability even after storage for 12 months at 26° C., meaning it is ideally suited to extended storage or transportation of the powder.

DETAILED DESCRIPTION OF THE INVENTION (Epoxy Resins that Act as Reaction Raw Materials for Amine Modified Epoxy Resins)

Typical epoxy resins containing an average of at least two epoxy groups within each molecule can be used, without any particular restrictions, as the epoxy resin used as the raw material for the amine modified epoxy resin used in the present invention. For example, the epoxy resins listed below can be used either singularly, or in combinations of two or more resins.

(1) Phenol Based Glycidyl Ether Type Epoxy Resins:
Phenol based glycidyl ether type epoxy resins produced by the reaction of a phenol compound such as bisphenol A, bisphenol F, tetrabromobisphenol A, tetraphenylolethane, phenol novolak, or cresol novolak with epichlorohydrin.

(2) Alcohol Based Glycidyl Ether Type Epoxy Resins:
Alcohol based glycidyl ether type epoxy resins produced by the reaction of (a) either a polyol produced by an addition reaction between a phenol compound such as bisphenol A, bisphenol F, tetrabromobisphenol A or tetraphenylolethane and an alkylene oxide, or alternatively, a polyol such as hydrogenated bisphenol A, with (b) epichlorohydrin.

(3) Glycidyl Ester Type Epoxy Resins:
Glycidyl ester type epoxy resins such as diglycidyl ester hexahydrophthalate and dimer acid glycidyl ester.

(4) Glycidyl Amine Type Epoxy Resins:
Glycidyl amine type epoxy resins such as 1,3-diglycidylhydantoin, triglycidyl isocyanurate, tetraglycidyldiaminodiphenylmethane, and triglycidyl-paraminophenol.

(5) Mixed Epoxy Resins:
Mixed epoxy resins such as epoxy resins produced by the reaction of aminophenol or oxybenzoic acid with epichlorohydrin; alicyclic epoxy resins with cyclopentadiene or dicyclopentadiene skeletons, and brominated epoxy resins.

In order to ensure that the cured product of the curable epoxy resin composition acquires a sufficiently high glass transition temperature and superior heat resistance, the epoxy group equivalent of the epoxy resin is preferably within a range from 100 to 2000, and preferably from 130 to 1000, and most preferably from 150 to 800.

(Polyamines that Act as Reaction Raw Materials for Amine Modified Epoxy Resins)

The polyamine that functions as a raw material for the amine modified epoxy resin used in the present invention is not restricted to amine based curing agents typically used for epoxy resins, and a wide variety of polyamines can be used, although polyamines that are typically used as epoxy resin curing agents are the most easily employed. Examples of suitable polyamines include aliphatic polyamines such as diethylenetriamine, triethylenetetramine, teraethylenepentamine, diethylaminopropylamine, N-aminoethylpiperazine, isophoronediamine, bis(4-amino-3-methylcyclohexyl)methane, and methanediamine; aliphatic polyamines such as tetraethylenepentamine that have been modified with a fatty acid or benzoic acid; aromatic amines such as phenylenediamine, metaphenylenediamine, diaminodiphenylamine, and benzyldimethylamine; as well as dicyandiamide, silicon based amines, and polymethyleneamine. Of these, aliphatic polyamines are particularly preferred due to the ease with which the epoxy resin modification can be performed.

From the viewpoint of effectively increasing the glass transition temperature of the cured product of the curable epoxy resin composition, the relative proportions of the epoxy resin and the polyamine used during production of the amine modified epoxy resin are preferably set so that the ratio (X) of the active hydrogen atom equivalent of the polyamine relative to the epoxy equivalent of the epoxy resin is within a range from 10 to 100%, and even more preferably from 20 to 80%, and most preferably from 30 to 70%.

Examples of the boric acid used in the present invention include orthoboric acid, metaboric acid, tetraboric acid or mixtures thereof. Furthermore, examples of the borate ester include hydrolysable boron alkoxides represented by a general formula (1) below, or partial hydrolysates or borate esters thereof, as well as tricresyl borate, boroxin, and boric anhydride. Of these, borate esters represented by the general formula (1), and partial hydrolysates or partial polycondensates of such borate esters are particularly preferred.

General Formula (1)

(wherein, n represents an integer from 1 to 3, R represents a $C_mH_{2m+1}$ alkyl group, and m represents an integer of 1 to 10.)

The partial polycondensates described above can be produced by a process in which a borate ester represented by the general formula (1), water, a solvent, and where necessary an acid or base catalyst, are mixed and stirred together.

Specific examples of the borate ester include trimethyl borate, triethyl borate, tripropyl borate, tributyl borate, trihexyl borate, trioctyl borate, tristearyl borate, triphenyl borate, tritolyl borate, trixylyl borate, and tribenzyl borate. These boric acids or borate esters can be used singularly, or in combinations of two or more compounds.

The quantity of the boric acid and/or borate ester used in a curable epoxy resin composition of the present invention is an extremely important factor in increasing the glass transition temperature of the cured product of the curable epoxy resin composition. In the present invention, the quantity of the boric acid and/or borate ester is expressed as a $B_2O_3$ equivalent value. To provide some examples of $B_2O_3$ equivalent values, 100 g of $B(OH)_3$ converts to a $B_2O_3$ equivalent value of 56.3 g, and 100 g of $B(OC_2H_5)_3$ converts to a $B_2O_3$ equivalent value of 23.9 g.

The boron content (Y) within a curable epoxy resin composition, expressed as a $B_2O_3$ equivalent value relative to the $B_2O_3$ equivalent value of the total weight of the amine modified epoxy resin and the boric acid and/or borate ester, is typically within a range from 2 to 30% by weight, and preferably from 3 to 25% by weight, and even more preferably from 3 to 20% by weight, and most preferably from 5 to 15% by weight. By adjusting the boron content to a value within this range, the glass transition temperature of the cured product of the curable epoxy resin composition can be satisfactorily increased. Furthermore, in terms of imparting a high level of transparency to the cured product, the boron content is preferably within a range from 2 to 20% by weight, and even more preferably from 2 to 15% by weight. If the boron content exceeds 30% by weight then the obtained cured product loses uniformity, and is prone to becoming brittle.

In a curable epoxy resin composition of the present invention, the ideal value for the boron content (Y) relative to the combined weight of the amine modified epoxy resin and the boric acid and borate ester varies in accordance with changes in the value of the ratio (X) of the active hydrogen atom equivalent of the polyamine relative to the epoxy equivalent of the epoxy resin. Preferred relationships between (X) and (Y) are described below.

Namely, when (X) is less than 40%, (Y) is preferably within a range from 2 to 30% by weight, and even more preferably from 4 to 30% by weight. When (X) is within a range from 40 to 70%, (Y) is preferably within a range from 2 to 25% by weight, and even more preferably from 3 to 20% by weight. Furthermore, when (X) exceeds 70%, (Y) is preferably within a range from 2 to 20% by weight, and even more preferably from 2 to 15% by weight.

In addition, a powdered curable epoxy resin composition of the present invention preferably has an (X) value within a range from 10 to 100%, and even more preferably from 20 to 80%, and most preferably from 30 to 70%, and a (Y) value within a range from 3 to 25% by weight, and even more preferably from 3 to 20% by weight, and most preferably from 5 to 15% by weight. Moreover, when (X) and (Y) satisfy the relationships defined by the formulas (1) and (2) shown below, superior storage stability can be achieved.

$(X/2+Y) \leq H$     (Formula 1)

$(X/20+Y) \geq L$     (Formula 2)

(wherein, H is 45 and L is 5, or even more preferably H is 43 and L is 7.)

A curable epoxy resin composition of the present invention can be produced by reacting the epoxy resin and the polyamine in an organic solvent to form an amine modified epoxy resin, and then uniformly dissolving the boric acid and/or borate ester in the organic solvent solution of the prepared amine modified epoxy resin.

There are no particular restrictions on the organic solvent used, provided it is an unreactive organic solvent capable of uniformly dissolving the epoxy resin, the polyamine and the boric acid or borate ester. Specific examples of the organic solvent include lower alcohols of 1 to 6 carbon atoms such as methanol, ethanol and propanol, as well as acetone, tetrahydrofuran, methyl ethyl ketone, N-methylpyrrolidone, dimethylacetamide, and methyl ethyl cellosolve, and these solvents can be used singularly, or in mixtures of two or more solvents.

Preferred examples of the aforementioned lower alcohols include methanol, ethanol, propanol and isopropanol. In those cases in which boric acid is used, the use of at least a portion of an organic solvent containing at least a portion of a lower alcohol is particularly effective, as it enables the production of a transparent epoxy resin composition solution with the boric acid dissolved uniformly therein.

Next is a description of processes for producing a curable epoxy resin composition and a powdered curable epoxy resin composition according to the present invention.

A process for producing a curable epoxy resin composition according to the present invention comprises a first step for partially reacting an epoxy resin and a polyamine in an organic solvent to produce a non-gel type amine modified epoxy resin, and a second step for uniformly dissolving at least one of boric acid and a borate ester in the organic solvent solution of the prepared amine modified epoxy resin.

Both the first step and the second step can be conducted within a temperature range from 25° C. to 120° C.

The reaction temperature for the first step is preferably within a range from 30 to 100° C., and even more preferably from 35 to 90° C. The reaction time is typically from 0.05 to 40 hours, and preferably from 0.1 to 30 hours, and even more preferably from 0.2 to 20 hours.

In the second step, the boric acid and/or the borate ester is added with stirring, either as is or in the form of an organic solvent solution, to the reaction solution from the first step. During this addition, in the case of a borate ester, a quantity of water equivalent to 0.3 to 3 times the number of mols of the borate ester may also be added if required. The resulting mixture is stirred to uniformly dissolve the boric acid and/or borate ester in the amine modified epoxy resin, thereby producing the epoxy resin composition in solution form.

The stirring during the second step is preferably conducted until the product epoxy resin solution becomes uniform and transparent. By applying a gentle heat during the stirring process, a uniform and transparent varnish type epoxy resin solution can be prepared with ease. The temperature of this heating during the stirring process is typically within a range from 25 to 120° C., and preferably from 30 to 100° C., and even more preferably from 30 to 90° C. The stirring is typically conducted for a period of 0.05 to 30 hours, and preferably from 0.1 to 20 hours, and even more preferably from 0.2 to 10 hours.

If the temperature during stirring in the first and second steps is less than 25° C., then particularly in those cases in which boric acid is used, the boric acid does not dissolve, resulting in a non-transparent epoxy resin solution, and the appearance of sedimentation. Furthermore, even in those cases in which a borate ester is used, when the organic solvent is subsequently removed in order to prepare the powdered curable epoxy resin composition, the boron compound tends to be prone to aggregation and phase separation. Particularly in those cases in which boric acid is used, the reaction of the first step is preferably conducted at a reaction temperature within a range from 30 to 120° C., in order to enable the production of a transparent epoxy resin composition solution. However if the temperature during stirring exceeds 120° C., then the curable epoxy resin composition is prone to gelling, and not particularly practical.

The stirring during the first and second steps does not require particularly vigorous stirring, but it is important that the stirring is appropriately adjusted to ensure that the boric acid and/or borate ester is uniformly dissolved within the amine modified epoxy resin. If the stirring is inadequate, then boric acid in particular may not dissolve, increasing the likelihood of a non-transparent epoxy resin solution, whereas a borate ester is likely to aggregate into lumps larger than micron size following removal of the organic solvent, and in either case, a cured product of the epoxy resin composition with a high glass transition temperature cannot be obtained.

A solution based curable epoxy resin composition produced by the process described above can be used as a heat resistant coating material for substrates such as metals, ceramics or heat resistant plastics, and can also be used as a heat resistant impregnant for glass fiber.

In one practical example of the use of a solution based curable epoxy resin composition according to the present invention, a heat resistant laminated sheet can be produced by providing an uncured coating layer of the solution based curable epoxy resin composition on top of a heat resistant substrate sheet, layering a separate heat resistant substrate sheet on top of the uncured coating layer, and then subjecting the two heat resistant substrate sheets to thermocompression bonding, thereby curing the uncured coating layer by causing a reaction between (A) the amine modified epoxy resin, and (B) the at least one of boric acid and borate ester.

Example of the heat resistant substrate sheet include sheets formed from heat resistant materials selected from inorganic materials such as copper, aluminum, titanium and ceramics; organic materials such as heat resistant polyester, polyamide or polyimide; and organic-inorganic composite materials such as glass fiber reinforced polyester or glass fiber reinforced epoxy resins.

For example, by layering a glass cloth resin molded sheet and a copper foil sheet to which has been applied a layer of a liquid curable epoxy resin composition according to the present invention, and then subjecting the structure to hot pressing at 150° C. and 100 MPa, a copper clad laminate that is useful for electronic components can be prepared.

A powdered curable epoxy resin composition of the present invention can be produced by removing the organic solvent from an aforementioned solution produced by uniformly dissolving (A) a non-gel type amine modified epoxy resin obtained by reacting an epoxy resin and a polyamine, and (B) at least one of boric acid and a borate ester in (C) the organic solvent, and subsequently crushing the resulting solid curable epoxy resin composition.

The removal of the organic solvent from the solution based curable epoxy resin composition can be carried out by normal methods using a hot air dryer, a freeze dryer, or a vacuum dryer, although the organic solvent is preferably removed by heating the solution based curable epoxy resin composition at a temperature of 30 to 150° C., either under a hot air stream in normal atmospheric conditions, or under conditions of reduced pressure. The ideal temperature for removing the organic solvent varies depending not only on the type of organic solvent used, but also on the type of polyamine used, and for example in the case of an aliphatic polyamine, the temperature is preferably within a range from 40 to 120° C. The crushing can be performed using normal methods, and the solid resin is preferably crushed to a powder with an average particle size of no more than 500 µm, and subsequently subjected to further drying under reduced pressure at a temperature of 40 to 100° C.

A heat resistant cured product can be molded by subjecting a powdered curable epoxy resin composition produced by the process described above to compression molding under heat, thereby curing the composition by causing a reaction between the amine modified epoxy resin and at least one of the boric acid and borate ester. The heating temperature varies depending on the epoxy resin and polyamine used, and although there are no particular restrictions, typical temperatures are from 130 to 200° C.

A cured product of a curable epoxy resin composition according to the present invention displays a glass transition temperature that is 50 to 200° C. higher than that of a cured product from an epoxy resin with an identical composition, but with the exception of containing neither boric acid nor a borate ester, and cured products with glass transition temperatures higher than 300° C. can be produced.

Furthermore, a cured product of a curable epoxy resin composition of the present invention not only displays a high glass transition temperature, but also provides excellent mechanical characteristics such as tensile strength and elastic modulus. Namely, a cured product of a curable epoxy resin composition of the present invention displays a tensile strength, measured in a test of tensile strength under conditions including a gauge sample length of 15 mm, a thickness of 0.35 mm, a crosshead speed of 2 mm/minute, and a measurement temperature of 25° C., that is 10 MPa to 20 MPa higher than the tensile strength of a cured product from a curable epoxy resin with an identical composition, but with the exception of containing neither boric acid nor a borate ester.

Furthermore, the tensile elastic modulus of a cured product of a curable epoxy resin composition of the present invention is 300 MPa to 1000 MPa higher than the tensile elastic modulus of a cured product from an epoxy resin with an identical composition, but with the exception of containing neither boric acid nor a borate ester. In addition, a cured product of a curable epoxy resin composition of the present invention displays a similar level of tensile elongation at break to a cured product from an epoxy resin with an identical composition, but with the exception of containing neither boric acid nor a borate ester.

A curable epoxy resin composition of the present invention enables the production of a cured product with a glass transition temperature, a tensile strength, and a tensile elastic modulus that are all 20% to 30% higher than the corresponding values for a cured product from an epoxy resin composition with an identical composition, but with the exception of containing neither boric acid nor a borate ester. Furthermore, a cured product of a curable epoxy resin composition of the present invention provides substantially the same level of transparency as a cured product from an epoxy resin composition with an identical composition, but with the exception of containing neither boric acid nor a borate ester.

In addition, a cured product of a curable epoxy resin composition of the present invention also displays excellent electrical properties such as a high electrical resistance, a low dielectric constant and a low dielectric dissipation factor, as well as good resin surface smoothness, low thermal expansion, and good flame retardancy.

Furthermore, a powdered curable epoxy resin composition of the present invention not only enables the production of a cured product with a high glass transition temperature and excellent mechanical properties, but also displays excellent storage stability, and is ideally suited to prolonged storage or transportation of the product. In other words, a powdered curable epoxy resin composition of the present invention displays good thermal workability even after storage for 12 months at 26° C., meaning extended storage or transportation of the powder is possible.

A curable epoxy resin composition of the present invention displays the excellent characteristics described above, and can be favorably used in a variety of fields, for materials of electrical and electronic components, as well as for general purpose molding materials, paints and adhesives and the like. More specific examples of potential applications include use of the compositions in molding materials and adhesive materials with excellent heat resistance and mechanical properties, laminated sheet materials with excellent electrical properties and heat resistance, and fiber reinforced molding materials with excellent heat resistance and mechanical properties.

EXAMPLES

A more specific description of the present invention is provided below based on a series of examples. In the examples, unless otherwise stated, the units "parts" and "%" refer to weight referenced values. Furthermore in the examples described below, the various measurements are conducted using the methods described below.

(Light Transmittance)

The light transmittance was measured as the parallel light transmittance of a film of thickness 100 nm, using a NDH-300A device manufactured by Nippon Denshoku Industries Co., Ltd.

(Observation under Microscope)

Observation of the cured product under microscope was conducted by preparing an ultrathin section of the cured product, and then observing the section using an optical microscope (VH5910, manufactured by Keyence Corporation), a scanning electron microscope (manufactured by Hitachi, Ltd.) or a transmission electron microscope (JEM-200CX, manufactured by Jeol Ltd.)

(Dynamic Viscoelasticity Measurement)

The glass transition temperature and the storage elastic modulus (E') were measured using a Dynamic Mechanical Analyzer (DMA-200, manufactured by Seiko Instruments Inc.) under conditions including a measurement frequency of 1 Hz, and a rate of temperature increase of 2° C./minute. The glass transition temperature (Tg) was recorded as the tan δ peak temperature (tan $\delta_{max}$).

(Tests of Tensile Strength)

Tests of tensile strength were performed using an Autograph AGS-H manufactured by Shimadzu Corporation, using a sample with a gauge sample length of 15 mm, a width of 7 mm and a thickness of approximately 0.35 mm, and under conditions including a crosshead speed of 2 mm/minute, and a test temperature of 25° C., and enabled the determination of the tension elastic modulus, the elongation at break, and the tensile strength.

(Electrical Properties)

The dielectric constant and the dielectric dissipation factor were measured using a dielectric measuring device manufactured by Japan EM Co., Ltd., using a molded sheet of thickness 2 mm, and conditions including a frequency of 1 MHz and a temperature of 25° C.

Example 1

100 g of a bisphenol type epoxy resin Epiclon 850 (manufactured by Dainippon Ink and Chemicals, Inc., epoxy equivalent 190 g/eq), 32.4 g of an aliphatic polyamine Epiclon B-053 (manufactured by Dainippon Ink and Chemicals, Inc., active hydrogen equivalent 77 g/eq) (an epoxy equivalent ratio of 80%), and 80 g of tetrahydrofuran (special reagent grade, manufactured by Wako Pure Chemical Industries Ltd.) were mixed together and then stirred for 8 hours at 30° C.

Subsequently, 29.2 g of boric acid ethyl ester (manufactured by Gelest Inc., U.S.A.) (a Y value of 5% by weight) was added dropwise to the epoxy resin solution and stirred for 10 minutes, yielding a uniform, transparent solution. This solution was then cast onto a clean aluminum foil sheet at 24° C. and under normal atmospheric conditions (humidity 50%), and subjected to solvent casting for 12 hours, yielding a curable epoxy resin composition. Subsequently, heat treatment was performed at 150° C. for 2 hours, and then at 180° C. for a further 2 hours, thus producing a cured product of the curable epoxy resin composition.

The produced cured product displayed excellent transparency, with a light transmittance in the visible light region of 91.1% (for a thickness of 100 μm). Furthermore, the product had no cracks, creases or air bubbles, and had a favorable surface state. An ultrathin section of the cured product was prepared and observed using a transmission electron microscope (250,000× magnification), which revealed a uniform texture throughout, with no aggregation of boron compounds such as boron oxides visible. When the cured product was baked for 5 hours in an oxidizing atmosphere at 1000° C., the residual mass was 4.2% by weight.

Figure 1:
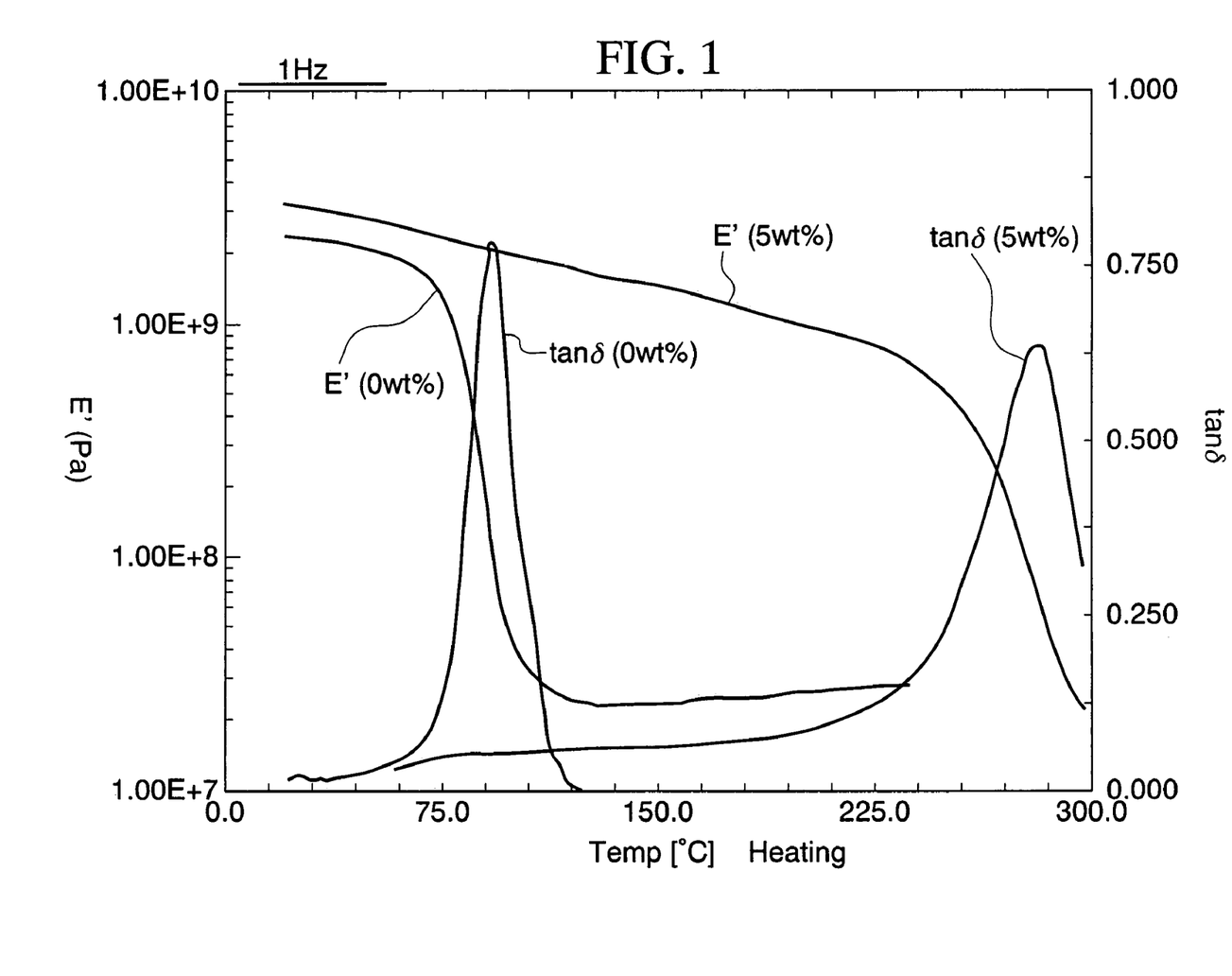
FIG. 1 is a diagram showing the relationship between the storage elastic modulus (E'), tan δ, and the temperature, for epoxy resin cured products produced in an example 1 and a comparative example 1.

Using a cured product of thickness 260 μm, a dynamic viscoelasticity measurement (frequency 1 Hz) was conducted. The relationship between the obtained results for the storage elastic modulus (E'), tan δ, and the temperature is shown in FIG. 1. The vertical axis in FIG. 1 represents the storage elastic modulus (E'), and the horizontal axis represents the temperature (° C.). FIG. 1 also shows the results for a comparative example 1, which represents the cured product from an epoxy resin with an identical composition, but without the boric acid ethyl ester. Whereas the tan δ peak temperature (Tg) for the comparative example 1 was 92° C., the equivalent value for the cured product of the example 1, containing a $B_2O_3$ equivalent value of 5% by weight, was 280° C. It is clear that the formation of a composite material with the boron compound vastly improves the heat resistance of the epoxy resin composition.

Furthermore, when a test of tensile strength was performed on the cured product, the results revealed a strength of 71.4 MPa, an elastic modulus of 1.82 GPa, and a elongation at break of 6.78%, which represent superior mechanical properties to those of the cured product of the epoxy resin composition with no borate ester (the comparative example 1).

Furthermore, the coefficient of thermal expansion between 30 and 230° C. for the epoxy resin cured product produced in the example 2 was $6.9 \times 10^{-5}$ °$C.^{-1}$. In contrast, the coefficient of thermal expansion between 30 and 80° C. for the epoxy resin cured product produced in the comparative example 1 was $11.1 \times 10^{-5}$ °$C.^{-1}$, and the coefficient of thermal expansion between 80 and 230° C. was $20.4 \times 10^{-5}$ °$C.^{-1}$. In short, the epoxy resin cured product of the example 2 displayed a lower thermal expansion than the cured product of the comparative example 1 across a broad temperature range.

TABLE 1

|  |  | Example 1 | Example 2 | Example 3 |
|---|---|---|---|---|
| Composition | Epoxy resin | 100 g | 100 g | 100 g |
|  | epoxy group equivalent | 190 g/eq | 190 g/eq | 190 g/eq |
|  | Polyamine | 32.4 g | 20 g | 12.2 g |
|  | active hydrogen equivalent | 77 g/eq |  |  |
|  | (ratio to epoxy group equivalent) | (80%) | (50%) | (30%) |
|  | Organic solvent | THF 80 g | THF 140 g | MEK 80 g water 9.7 g |
| Conditions for stirring under heat (1) |  | 30° C., 8 h | 30° C., 14 h | 30° C., 8 h |
| Boric acid ethyl ester ($B_2O_3$ equivalent ratio) |  | 29.2 g (5%) | 56 g (10%) | 52.2 g (7%) |
| Conditions for stirring under heat (2) |  | 25° C., 10 min. | 25° C., 10 min. | 25° C., 10 min. |
| Cured product | Tg (° C.) | 280 | 277 | 249 |

TABLE 2

|  |  | Comparative example 1 | Comparative example 2 | Comparative example 3 |
|---|---|---|---|---|
| Composition | Epoxy resin | 100 g | 100 g | 100 g |
|  | epoxy group equivalent | 190 g/eq | 190 g/eq | 190 g/eq |
|  | Polyamine | 32.4 g | 20 g | 12.2 g |
|  | (ratio to epoxy group equivalent) | (80%) | (50%) | (30%) |
|  | Boric acid ethyl ester |  | None (0%) |  |
|  | Organic solvent | THF 80 g | THF 140 g | MEK 80 g water 9.7 g |
| Conditions for stirring under heat (1) |  | 30° C., 8 h | 30° C., 14 h | 30° C., 8 h |
| Conditions for stirring under heat (2) |  | 25° C., 10 min. | 25° C., 10 min. | 25° C., 10 min. |
| Cured product | Tg (° C.) | 92 | 86 | 47 |

Examples 2 and 3, Comparative Examples 1 to 3

As shown in Table 1, in each of the examples 2 and 3, a curable epoxy resin composition and a cured product thereof were prepared under the same conditions as the example 1, using the bisphenol type epoxy resin Epiclon 850 and the aliphatic polyamine Epiclon B-053, but with the exception of altering the quantities of the polyamine and the boric acid ethyl ester. Furthermore, in the comparative examples 1 to 3, epoxy resin compositions and cured products thereof were produced in the same manner as the examples 1 to 3, but with the exception of not adding the boric acid ethyl ester. It is very clear that the Tg values of the epoxy resin cured products obtained in the examples 1 to 3 were much higher than the Tg values of the epoxy resin cured products from the comparative examples 1 to 3, in which no boric acid ethyl ester was added.

Table 3 shows the values for the light transmittance, the tensile strength, the elastic modulus, and the elongation at break for the cured products from the epoxy resin compositions of the examples 1 to 3, and the cured products for the epoxy resin compositions of the comparative examples 1 to 3, containing no boric acid ethyl ester. The tensile strength and elastic modulus values for the cured products of the epoxy resin compositions of the examples 1 to 3 were superior to the tensile strength and elastic modulus values for the corresponding cured products obtained from the epoxy resin compositions of the comparative examples 1 to 3. Furthermore, the light transmittance values for the cured products of the epoxy resin compositions of the examples 1 to 3 were substantially the same as the light transmittance values for the corresponding cured products obtained from the epoxy resin compositions of the comparative examples 1 to 3, containing no boric acid ethyl ester.

TABLE 3

|  | Example 1 | Example 2 | Example 3 | Comparative example 1 | Comparative example 2 | Comparative example 3 |
|---|---|---|---|---|---|---|
| Light transmittance (%) | 91 | 92 | 88 | 90 | 91 | 91 |
| Strength (MPa) | 71.4 | 68.5 | 67.4 | 50.9 | 48.0 | 36.2 |
| Elastic modulus (GPa) | 1.82 | 2.54 | 2.62 | 1.19 | 1.06 | 0.82 |
| Elongation at break (%) | 6.78 | 3.07 | 2.85 | 6.57 | 7.83 | 5.31 |

Examples 4 and 5

The examples 4 and 5 used the same bisphenol type epoxy resin Epiclon 850 and aliphatic polyamine Epiclon B-053 as the example 1, and with the exception of altering the quantities of the polyamine and the boric acid ethyl ester as shown in Table 4, curable epoxy resin compositions and cured products thereof were prepared in the same manner as the example 1.

TABLE 4

|  |  | Example 4 | Example 5 |
|---|---|---|---|
| Composition | Epoxy resin | 100 g | 100 g |
|  | epoxy group equivalent | 190 g/eq | 190 g/eq |
|  | Polyamine | 20 g | 20 g |
|  | active hydrogen equivalent |  |  |
|  | (ratio to epoxy group equivalent) | (50%) | (50%) |
|  | Organic solvent | THF 100 g | THF 100 g |
| Conditions for stirring under heat (1) |  | 30° C., 8 h | 30° C., 8 h |
| Boric acid ethyl ester ($B_2O_3$ equivalent ratio) |  | 15.5 g (3%) | 10.3 g (2%) |
| Conditions for stirring under heat (2) |  | 25° C., 10 min. | 25° C., 10 min. |
| Cured product Tg (° C.) |  | 196 | 138 |

Examples 6 to 9

Using a bisphenol type epoxy resin (Epiclon 850), an aliphatic polyamine (Epiclon B-053), and boric acid (manufactured by Gelest Inc., U.S.A.), curable epoxy resin compositions and cured products thereof were prepared in substantially the same manner as the example 1, under the conditions shown in Table 5. The solutions prior to casting were uniform, transparent solutions in each case. Each of the obtained cured products was transparent, had a favorable appearance with no cracks, creases or air bubbles, and displayed a higher Tg value and superior mechanical properties when compared with a cured product from a curable epoxy resin composition with an identical composition, but with the exception of containing no boric acid. The composition of the curable epoxy resin compositions, and the evaluation results for the cured products are shown in Table 5.

TABLE 5

|  |  | Example 6 | Example 7 | Example 8 | Example 9 |
|---|---|---|---|---|---|
| Composition | Epoxy resin | 100 g | 100 g | 100 g | 100 g |
|  | epoxy group equivalent | 190 g/eq | 190 g/eq | 190 g/eq | 190 g/eq |
|  | Polyamine | 12.2 g | 20 g | 20 g | 20 g |
|  | active hydrogen equivalent | 77 g/eq |  |  |  |
|  | (ratio to epoxy group equivalent) | (30%) | (50%) | (50%) | (50%) |
|  | Organic solvent | THF 100 g | THF 100 g | THF 100 g | MEK 100 g |
|  |  |  |  | MeOH 50 g | MeOH 60 g |
| Conditions for stirring under heat (1) |  | 30° C., 8 h | 30° C., 8 h | 30° C., 8 h | 80° C., 1 h |
| Boric acid ($B_2O_3$ equivalent ratio) |  | 19.8 g (9%) | 16.1 g (7%) | 9.0 g (4%) | 54 g (22%) |
| Conditions for stirring under heat (2) |  | 30° C., 2 h | 25° C., 2 h | 25° C., 10 min. | 35° C., 4 h |
| Cured product Tg (° C.) |  | 261 | 267 | 235 | 270 |

Examples 10 and 11, Comparative Examples 4 and 5

With the exceptions of using a dicyclopentadiene type epoxy resin (Epiclon HP-7200H-80M, a registered trademark, manufactured by Dainippon Ink and Chemicals, Inc., epoxy group equivalent 276 g/eq, solid content 80.4%) in the example 10 and the comparative example 4, and using a cresol novolak type epoxy resin (Epiclon N-673-70M, a registered trademark, manufactured by Dainippon Ink and Chemicals, Inc., epoxy group equivalent 214 g/eq, solid content 70.5%) in the example 11 and the comparative example 5, curable epoxy resin compositions and cured products thereof were prepared in the same manner as the example 1. The results for the cured products, including the curable epoxy resin composition of the comparative examples 4 and 5, which represent epoxy resins with identical compositions to the examples 10 and 11 respectively, but with the exception of containing no boric acid, are shown in Table 6. Furthermore, the values for the light transmittance, the tensile strength, the elastic modulus, and the elongation at break for the cured products of the curable epoxy resin compositions produced in the examples 6 to 8, and the examples 10 and 11, are shown in Table 7.

analyzed in the same manner as the product of the example 1, the result for the boron content within the cured product, expressed as a $B_2O_3$ equivalent value, was 1.9% by weight.

Comparative Example 6

With the exceptions of mixing 100 g of a bisphenol type epoxy resin (Epiclon 850), and 20 g of an aliphatic polyamine (Epiclon B-053) into 100 g of MEK (methyl ethyl ketone, special reagent grade, manufactured by Wako Pure Chemical Industries Ltd.) at 25° C., and then immediately adding 16.1 g of boric acid and stirring the resulting mixture for 10 minutes at 25° C., a curable epoxy resin composition was prepared in the same manner as the example 7. A cured product produced by immediately curing the prepared curable epoxy resin composition displayed a glass transition temperature of 82° C. Furthermore, when the surface and the cross section of the cured product were observed using an optical microscope (175× magnification)

TABLE 6

| | | Example 10 | Comparative example 4 | Example 11 | Comparative example 5 |
|---|---|---|---|---|---|
| Composition | Epoxy resin | 100 g | 100 g | 100 g | 100 g |
| | epoxy group equivalent | 276 g/eq | 276 g/eq | 214 g/eq | 214 g/eq |
| | Polyamine active hydrogen equivalent | 13.95 g | 13.95 g | 18 g | 18 g |
| | (ratio to epoxy group equivalent) | (50%) | (50%) | (50%) | (50%) |
| | Organic solvent | MEK 100 g | MEK 100 g | MEK 100 g MeOH 22.5 g | MEK 100 g MeOH 22.5 g |
| Conditions for stirring under heat (1) | | 40° C., 14.5 h | 40° C., 14.5 h | 40° C., 14.5 h | 40° C., 14.5 h |
| Boric acid ($B_2O_3$ equivalent ratio) | | 10.7 g (5%) | none | 23.3 g (10%) | none |
| Conditions for stirring under heat (2) | | 25° C., 4 h | 25° C., 4 h | 25° C., 4 h | 25° C., 4 h |
| Cured product | Tg (° C.) | 270.1 | 100.3 | >300 | 117.2 |

TABLE 7

| | Example 6 | Example 7 | Example 8 | Example 10 | Example 11 |
|---|---|---|---|---|---|
| Light transmittance (%) | 86 | 88 | 93 | 89 | 90 |
| Strength (MPa) | 65.9 | 76.9 | 60.2 | 60.5 | 54.8 |
| Elastic modulus (GPa) | 2.34 | 2.52 | 1.84 | 2.34 | 2.97 |
| Elongation at break (%) | 3.41 | 4.13 | 4.67 | 2.62 | 2.02 |

The cured products of the curable epoxy resin compositions produced in the examples 1 to 11 displayed favorable surface states with no cracks, creases or air bubbles. Furthermore, the cured products of the epoxy resin compositions produced in the comparative examples 1 to 5 were also transparent, and displayed good form, with no cracks, creases or air bubbles. Observation of the cured products at 500,000× magnification using a transmission electron microscope revealed absolutely no fine particles derived from boron compounds on the cured products of the epoxy resin compositions produced in the examples 1 to 11.

A sample of the cured product of the epoxy resin composition obtained in the example 1 was placed in an oxidizing atmosphere, the temperature was raised at a rate of 10° C./minute, and the product was baked for 1 hour at 1000° C., yielding a burned product. Measurement of the $B_2O_3$ concentration by measuring the mass of the burned product and analyzing the infrared absorption spectrum of the burned product revealed a boron content within the cured product, calculated as a $B_2O_3$ equivalent value, of 4.8% by weight. Furthermore, when the cured product of the epoxy resin composition obtained in the example 5 was burned and and a scanning electron microscope (1000× magnification), boron compound aggregates with sizes ranging from several μm to several dozen μm were observed.

Example 12

40 g of the bisphenol type epoxy resin Epiclon 850 (manufactured by Dainippon Ink and Chemicals, Inc., epoxy equivalent 190 g/eq), 8.2 g of the aliphatic polyamine Epiclon B-053 (manufactured by Dainippon Ink and Chemicals, Inc., active hydrogen equivalent 77 g/eq) (an epoxy equivalent ratio of 50%), and 36 g of methyl ethyl ketone were mixed together and the resulting solution was stirred for 12 hours at 30° C.

Subsequently, 6.44 g of boric acid (a Y value of 7% by weight) was added gradually to the solution and stirred for 4 hours. 3 g of methanol was then added dropwise, and the resulting mixture was stirred for a further 30 minutes, yielding a uniform, transparent solution. The obtained uniform, transparent solution was cast onto a tray and subjected to solvent casting for 15 hours at 30° C. under normal atmospheric conditions. Subsequently, the product was treated in a hot air dryer, for 3 hours at 50° C., and then for a further 3 hours at 80° C., before the sample was crushed to a powder with a particle size of no more than 180 μm. This powder was then vacuum dried for 2 hours at 60° C., yielding a powdered curable epoxy resin composition. For the conditions described above, X=50, Y=7, and in the aforementioned formula 1 and formula 2:

(X/2+Y)=32, and (X/20+Y)=9.5

When a sample of this powdered curable epoxy resin composition was heated to 1000° C. in an oxidizing atmosphere, and burned for 5 hours at 1000° C., a gray speckled black burned product was obtained, and the weight of this product was 6.51% by weight of the original powder sample. Next, a film or sheet type epoxy resin composition cured product was prepared by hot pressing a sample of the powdered curable epoxy resin composition at 150° C. The pressed sample was subsequently heated for 2 hours at 150° C., and then for a further 2 hours at 180° C. The obtained cured product displayed excellent transparency, with a light transmittance in the visible light region of 92.6% (calculated for a thickness of 100 μm). Furthermore, the product also displayed a favorable surface state, with no cracks, creases or air bubbles. An ultrathin section of the transparent epoxy resin cured product was prepared and then observed using a 500,000× transmission electron microscope, but no fine particles were visible.

Figure 2:
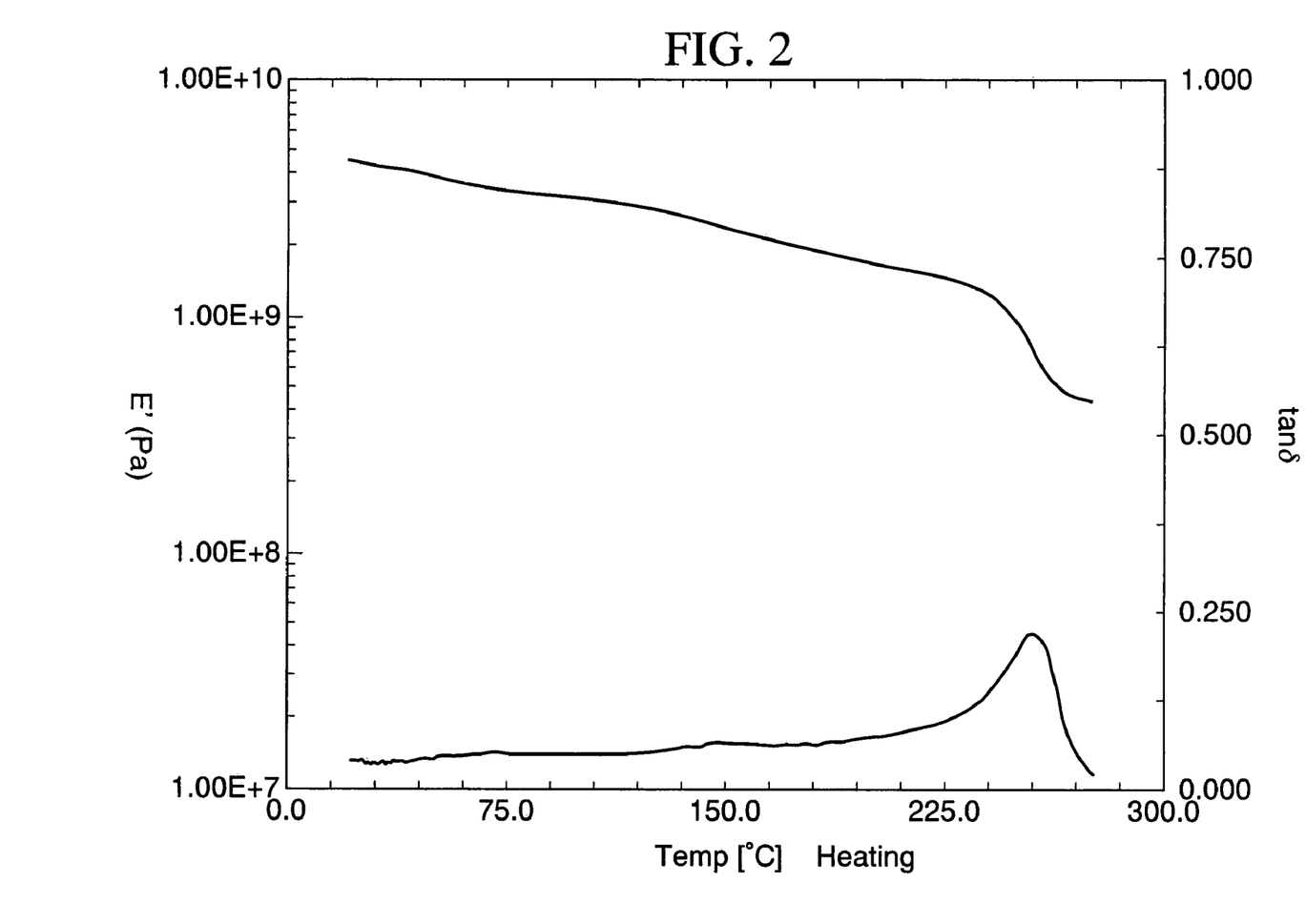
FIG. 2 is a diagram showing the relationship between the storage elastic modulus (E'), tan δ, and the temperature, for an epoxy resin cured product produced in an example 12.

Using a film of thickness 193 μm of the cured product of the curable epoxy resin composition, a dynamic viscoelasticity measurement (frequency=1 Hz) was conducted. The glass transition temperature was 256.2° C. The relationship between the storage elastic modulus (E'), tan δ, and the temperature is shown in FIG. 2. When a test of tensile strength was performed on the cured product of the curable epoxy resin composition, the results revealed a strength of 80.2 MPa, an elastic modulus of 2.23 GPa, and a elongation at break of 5.04%. Measurement of the dielectric constant revealed a result of 3.2, and the dielectric dissipation factor was 0.022. A comparative example 7, which was prepared in the same manner as the example 12, using a curable epoxy resin composition with an identical composition to the example 12, but with the exception of containing no boric acid, and examples 13 and 17, which are powdered curable epoxy resin composition prepared in the same manner as the example 12, but with slightly different compositions, are shown in Table 8.

In the example 17, 125 g (solid content 100 g) of Epiclon 1121N-80M (a registered trademark, manufactured by Dainippon Ink and Chemicals, Inc., epoxy equivalent 493 g/eq) was used as the epoxy resin, and with the solution undergoing constant stirring, the quantity of boric acid shown in Table 8 was added gradually, and the resulting mixture was subjected to further stirring. 3 g of methanol was then added dropwise, and the mixture was stirred for a further 30 minutes, yielding a uniform, transparent solution. Furthermore, examples 14 to 16, which used the same bisphenol type epoxy resin Epiclon 850 as the example 12, and in which powdered curable epoxy resin compositions were prepared in the same manner as the example 12 with the exception of altering the temperature conditions, are shown in Table 9. It is evident that as the heating temperature was increased, the time required for the heated stirring process could be shortened.

TABLE 8

|  |  | Example 12 | Comparative example 7 | Example 13 | Example 17 |
|---|---|---|---|---|---|
| Composition | Epoxy resin | 40 g | 40 g | 100 g | 100 g |
|  | epoxy group equivalent | 190 g/eq | 190 g/eq | 190 g/eq | 493 g/eq |
|  | Polyamine | 8.2 g | 8.2 g | 12.2 g | 7.8 g |
|  | active hydrogen equivalent | 77 g/eq | 77 g/eq | 77 g/eq | 77 g/eq |
|  | (ratio to epoxy group equivalent) | (50%) | (50%) | (30%) | (50%) |
|  | Organic solvent | MEK 36 g | MEK 36 g | THF 130 g MeOH 20 g | MEK 90 g MeOH 30 g |
| Conditions for stirring under heat (1) |  | 30° C., 12 h | 30° C., 12 h | 30° C., 30 h | 30° C., 12 h |
| Boric acid ($B_2O_3$ equivalent ratio) |  | 6.44 g (7%) | none | 22.2 g (10%) | 14.4 g (7%) |
| Conditions for stirring under heat (2) |  | MeOH 3 g 30° C., 15 h | MeOH 3 g 30° C., 15 h | MeOH 3 g 30° C., 15 h | MeOH 3 g 30° C., 15 h |
| (X/2 + Y) value |  | 32 | 50 | 25 | 32 |
| (X/20 + Y) value |  | 9.5 | 0 | 11.5 | 9.5 |
| Cured product Tg (° C.) |  | 256.2 | 87 | 233.2 | 193.8 |

TABLE 9

|  |  | Example 14 | Example 15 | Example 16 |
|---|---|---|---|---|
| Composition | Epoxy resin | 100 g | 100 g | 100 g |
|  | epoxy group equivalent | 190 g/eq | 190 g/eq | 190 g/eq |
|  | Polyamine | 20 g | 20 g | 20 g |
|  | active hydrogen equivalent | 77 g/eq | 77 g/eq | 77 g/eq |
|  | (ratio to epoxy group equivalent) | (50%) | (50%) | (50%) |
|  | Organic solvent | MEK 100 g | MEK 100 g | MEK 100 g |
| Conditions for stirring under heat (1) |  | 40° C., 14.5 h | 60° C., 3 h | 80° C., 1 h |
| Boric acid ($B_2O_3$ equivalent ratio) |  | 16.1 g (7%) | 16.1 g (7%) | 16.1 g (7%) |
| Conditions for stirring under heat (2) |  | 25° C., 4 h | 25° C., 4 h | 25° C., 4 h |
| (X/2 + Y) value |  | 32 | 32 | 32 |
| (X/20 + Y) value |  | 9.5 | 9.5 | 9.5 |
| Cured product Tg (° C.) |  | 260.5 | 259.1 | 256.4 |

Table 10 shows the values for the light transmittance, the tensile strength, the elastic modulus, and the elongation at break for the cured products of the curable epoxy resin compositions produced in the examples 12 and 14.

TABLE 10

|  | Example 12 | Example 14 |
| --- | --- | --- |
| Light transmittance (%) | 92.6 | 93 |
| Strength (MPa) | 80.2 | 78.5 |
| Elastic modulus (GPa) | 2.23 | 2.49 |
| Elongation at break (%) | 5.04 | 4.23 |

Example 18

40 g of an epoxy resin (Epiclon 850), 8.2 g of an aliphatic polyamine (Epiclon B-053), and 32 g of THF were mixed together, and then stirred for 14 hours at 30° C. Subsequently, 15.2 g of boric acid ethyl ester (manufactured by Gelest Inc.) (a Y value of 7%) was added to the epoxy resin solution with stirring. An aqueous solution comprising 8 g of THF and 5.6 g of water was then added dropwise to the epoxy resin solution, and stirring was continued until a uniform solution was obtained.

The obtained uniform, transparent solution was cast onto a tray and subjected to solvent casting for 15 hours at 30° C., under normal atmospheric conditions. Subsequently, the product was treated in a hot air dryer, for 1 hour at each of 50° C., 60° C., 70° C., 80° C., 90° C. and 100° C., and the resulting sample was then crushed to a powder with a particle size of no more than 180 μm. Subsequently, this powder was vacuum dried for 2 hours at 80° C., yielding a powdered curable epoxy resin composition. The X and Y values were the same as those described for the example 1.

When a sample of this powdered curable epoxy resin composition was heated to 1000° C. in an oxidizing atmosphere, and burned for 5 hours at 1000° C., a gray speckled black burned product was obtained, and the weight of this product was 6.24% by weight of the original powder sample.

Next, a film or sheet type epoxy resin cured product was prepared by hot pressing of a sample of the powdered curable epoxy resin composition at 165° C. The cured product produced by subsequently heating the pressed sample for 2 hours at 150° C., and then for a further 2 hours at 180° C., displayed excellent transparency, with a light transmittance in the visible light region of 93.9% (calculated for a thickness of 100 μm). Furthermore, the product also displayed a favorable surface state, with no cracks, creases or air bubbles. The product also had excellent heat resistance, and the glass transition temperature obtained through a viscoelasticity measurement was 249.3° C.

When a test of tensile strength was performed, the results revealed a strength of 69.5 MPa, an elastic modulus of 1.74 GPa, and a elongation at break of 5.06%. In addition, when a sample of this powdered curable epoxy resin composition was stored at room temperature for 3 months, and subsequently subjected to both hot forming and measurement of the mechanical properties of the cured product, the same results as the example 1 were obtained, indicating an excellent level of storage stability.

TABLE 11

|  |  | Example 18 | Example 19 | Example 20 |
| --- | --- | --- | --- | --- |
| Composition | Epoxy resin | 40 g | 100 g | 150 g |
|  | epoxy group equivalent | 190 g/eq | 190 g/eq | 190 g/eq |
|  | Polyamine | 8.2 g | 12.2 g | 42.6 g |
|  | active hydrogen equivalent | 77 g/eq | 77 g/eq | 77 g/eq |
|  | (ratio to epoxy group equivalent) | (50%) | (30%) | (70%) |
|  | Organic solvent | THF 32 g | THF 50 g | THF 130 g MeOH 45 g |
| Conditions for stirring under heat (1) |  | 30° C., 14 h | 30° C., 30 h | 30° C., 30 h |
| Boron compound ($B_2O_3$ equivalent ratio) |  | boric acid ethyl ester 15.2 g (7%) | boric acid ethyl ester 52.3 g (10%) | boric acid 18 g (5%) |
| Conditions for stirring under heat (2) |  | 30° C., 15 h | 30° C., 15 h | 30° C., 15 h |
| (X/2 + Y) value |  | 32 | 25 | 40 |
| (X/20 + Y) value |  | 9.5 | 11.5 | 8.5 |
| Cured product Tg (° C.) |  | 249.3 | 229.3 | 212.8 |

Examples 19 and 20

With the exception of altering the conditions as shown in Table 11, mixed solutions were prepared in the same manner as the example 18, and these uniform, transparent solutions were each cast onto a tray and subjected to solvent casting for 15 hours at 30° C., under normal atmospheric conditions. Subsequently, each product was treated in a hot air dryer, for 1 hour at each of 50° C., 60° C., 70° C., 80° C., 90° C. and 100° C., and the resulting sample was then crushed to a powder with a particle size of no more than 180 μm. Subsequently, each powder was vacuum dried for 2 hours at 80° C., yielding a powdered curable epoxy resin composition. Next, a film or sheet type epoxy resin cured product was prepared by hot pressing a sample of each powdered curable epoxy resin composition at 165° C. The pressed samples were then heated for 2 hours at 150° C., and then for a further 2 hours at 180° C.

Table 12 shows the values for the light transmittance, the tensile strength, the elastic modulus, and the elongation at break for the cured product of the curable epoxy resin composition produced in the example 18.

TABLE 12

|  | Example 18 |
| --- | --- |
| Light transmittance (%) | 94 |
| Strength (MPa) | 69.5 |
| Elastic modulus (GPa) | 1.74 |
| Elongation at break (%) | 5.06 |

The cured products of the curable epoxy resin compositions produced in the examples 12 to 20 each displayed a favorable surface state with no cracks, creases or air bubbles, and when the products were observed with a transmission electron microscope at 500,000× magnification, no fine particles were observed. In contrast, attempts were made to hot press samples of the powdered curable epoxy resin composition obtained in the comparative example 6, at temperatures of 150° C., 165° C. and 180° C., but in each case the sample did not melt satisfactorily, and a film type cured product with a favorable external appearance could not be produced. Furthermore, in tests of tensile strength, these samples broke almost immediately, and the mechanical properties could not be measured. In this manner, the epoxy resin composition powders that contained neither boric acid nor a borate ester displayed poor hot forming characteristics, and voidless molded films with good surface smoothness could not be produced.

Example 21

A sample of the powdered curable epoxy resin composition obtained in the example 12 was stored at room temperature (26° C.) for 6 months, and hot press molding and heat treatment were then conducted in the same manner as the example 12. The melting characteristics of the sample during hot pressing were the same as those observed for the example 12, and the obtained cured product displayed excellent transparency, with a light transmittance in the visible light region of 92.0% (calculated for a thickness of 100 μm). Furthermore, the product also displayed a favorable surface state, with no cracks, creases or air bubbles. Furthermore the glass transition temperature was 257.1° C., the tensile strength was 81.3 MPa, the elastic modulus was 2.34 GPa, and the elongation at break was 5.0%, which represent substantially the same results as the example 12, indicating that a powdered curable epoxy resin composition of the present invention provides excellent storage stability.

Furthermore, when samples of the powdered curable epoxy resin compositions obtained in the examples 13 to 20 were similarly stored at room temperature (26° C.) for 12 months, subsequently subjected to hot forming, and the mechanical properties of the cured product then measured, these powdered curable epoxy resin compositions also displayed excellent retention of their mechanical properties, in a similar manner to the powdered curable epoxy resin composition of the example 12, indicating excellent storage stability.

Example 22

With the exception of replacing the 100 g of THF with a mixture of 50 g of methyl ethyl ketone and 15 g of methanol, a uniform, transparent curable epoxy resin composition solution was prepared in the same manner as the example 7. Using a 0.2 mm applicator, this solution was applied to copper foil (thickness 32 microns) at room temperature, and subsequently subjected to drying in a vacuum drying device, at room temperature and then at 60° C. for a total of 6 hours, yielding a copper foil sample provided with an uncured coating layer of a curable epoxy resin composition. The thickness of the uncured coating layer was approximately 50 μm. By layering a glass cloth resin molded sheet and the coated copper foil, and then subjecting the structure to hot pressing at 150° C. and 100 MPa, a copper clad laminate was prepared. The prepared copper clad laminate was then subjected to a humidity and solder resistance test by treating the laminate for 2 hours in a 100° C. steam atmosphere, and then immersing the laminate in a solder bath at 260° C. for 30 seconds. The results of the test revealed favorable humidity and solder resistance, with no swelling, air bubbles or cracking. Furthermore, the laminate also displayed good adhesion in a test of peel strength at 90 degree, indicating a favorable copper laminate.

Example 23

22.5 g (resin solid content 18 g) of a low brominated bisphenol A type epoxy resin (Epiclon 1121N-80M, manufactured by Dainippon Ink and Chemicals, Inc., epoxy equivalent 493 g/eq), 2.25 g of an aliphatic polyamine (Epiclon B-053, manufactured by Dainippon Ink and Chemicals, Inc.) (an epoxy equivalent ratio of 80%), and 8.1 g of methyl ethyl ketone were mixed together and then stirred for 15 hours at 30° C. Subsequently, 3.6 g of methanol and 3.22 g of boric acid (a Y value of 5% by weight) were added, and stirring was continued for a further 2 hours at 30° C., yielding a uniform, transparent curable epoxy resin composition solution. This solution was used to prepared a copper clad laminate in a similar manner to the example 22, and when a humidity and solder resistance test and a test of peel strength at 90 degree were conducted, the results revealed that the copper clad laminate displayed the same excellent levels of humidity and solder resistance and adhesion as the example 22.

What is claimed is:

1. A curable epoxy resin composition comprising: (A) a non-gelled amine-modified epoxy resin obtained by reacting an epoxy resin and a polyamine; and (B) at least one of boric acid and a borate ester, wherein
   a boron content (Y) is within the range of 4% to 30% by weight when a ratio (X) is less than 40%;
   (Y) is within the range of 3% to 25% by weight when (X) is within the range of 40% to 70%;
   (Y) is within the range of 5% to 20% by weight when (X) is over 70%; and
   (X) and (Y) satisfy a relationship defined by the formula (1):
   $(X/2+Y) \leq 45$, and the general formula (2): $(X/20+Y) \geq 5$,
   where the ratio (X) represents a ratio of an active hydrogen atom equivalent of the polyamine relative to an epoxy equivalent of the epoxy resin, and the boron content (Y) represents a boron content, expressed as a $B_2O_3$ equivalent value, relative to a $B_2O_3$ equivalent value of a total weight of (A) the amine-modified epoxy resin, and (B) the boric acid and the borate ester.

2. A curable epoxy resin composition according to claim 1, further comprising an organic solvent, wherein said (A) amine-modified epoxy resin and said (B) at least one of boric acid and a borate ester are uniformly dissolved in (C) the organic solvent.

3. A curable epoxy resin composition according to claim 1, wherein said composition is in a powdered form in which said (B) at least one of boric acid and a borate ester is uniformly compatible or finely dispersed within said (A) amine-modified epoxy resin.

* * * * *